United States Patent [19]

Kim

[11] Patent Number: 5,054,618

[45] Date of Patent: Oct. 8, 1991

[54] SEALED CONTAINER WITH TEAR OPENING FEATURE

[76] Inventor: Myun H. Kim, 141 Meserole Ave. #22, Brooklyn, N.Y. 11222

[21] Appl. No.: 538,129

[22] Filed: Jun. 14, 1990

Related U.S. Application Data

[63] Continuation-in-part of Ser. No. 77,443, Jul. 24, 1987, Pat. No. 4,936,464.

[51] Int. Cl.$^5$ .......................... B65D 3/26; B65D 5/54
[52] U.S. Cl. .................................. 206/605; 206/608; 206/610; 206/617
[58] Field of Search ............... 206/605, 606, 611, 618, 206/617, 616, 608, 610, 614, 630

[56] References Cited

U.S. PATENT DOCUMENTS

| 696,614 | 4/1902 | Wheatley | 206/616 |
|---|---|---|---|
| 1,032,026 | 7/1912 | Roden | 206/617 X |
| 2,418,526 | 4/1947 | Reitman | 206/605 |
| 2,517,801 | 8/1950 | Roush | 206/616 |
| 2,606,655 | 8/1952 | Rosen | 206/611 X |
| 2,699,286 | 1/1955 | Geffroy | 206/605 X |
| 2,778,562 | 1/1957 | Tilly | 206/605 |
| 3,011,691 | 12/1961 | McGlynn et al. | 206/605 |
| 4,790,355 | 1/1989 | Kim | 206/618 X |
| 4,877,139 | 10/1989 | Kim | 206/605 X |
| 4,936,464 | 6/1990 | Kim | 206/616 X |

FOREIGN PATENT DOCUMENTS 16784 of 1893 United Kingdom ................ 206/618

Primary Examiner—William I. Price
Attorney, Agent, or Firm—Schweitzer Cornman & Gross

[57] ABSTRACT

The disclosure relates to a container with a tear-open feature. A pair of closure flaps is bridged by a sealing tape structure which includes a central, tearable band bridging the area between the flaps, and spaced-apart guide means on opposite sides of the tear band, adhesively secured to the container flaps. The guide means may advantageously comprise plastic strips which are separate from but mounted on a carrier tape, or which may be an integral part of the tape structure joined to the central tearable strip by lines of weakness.

10 Claims, 2 Drawing Sheets

SEALED CONTAINER WITH TEAR OPENING FEATURE

RELATED APPLICATIONS

This application is a continuation-in-part of my copending U.S. application Serial No. 077,443, filed July 24, 1987, now U.S. Pat. No. 4,936,464, granted June 26, 1990.

BACKGROUND AND SUMMARY OF THE INVENTION

The present invention is directed to a tear strip opening feature for containers, and more particularly to a container including a continuous sealing tape provided with a novel and improved form of tear strip opening device. In its most advantageous form, the sealing tape is utilized to secure a pair of container closing flaps in enclosed and sealed condition and is provided with a novel tear strip feature whereby the container may be quickly and easily opened, providing a clean, neat tear along the severed edges of the tape. If desired, the tape may be provided with perforated punch lines or other lines of weakness along the edges of the tear strip to facilitate easy removal of the tear strip for opening the container.

In one form of the present invention, a container is provided with a continuous sealing tape, which is applied externally of the container, straddling and bridging the space between hinged cover flaps forming a wall (usually the top) of the container. Typically, both of the flaps are hinged, although in certain constructions there may be only a single hinged flap which cooperates with a fixed wall of the container.

In its most elementary form, the sealing tape structure comprises a continuous strip of tearable tape, formed of paper, plastic or like material, which is provided on one surface with an adhesive coating. A reinforcing strip is bonded to the center area of the tape by means of the adhesive coating or by other suitable means and forms a tear band. The bottom surface of the sealing tape structure is adhesively coated over its full surface, except for the exposed surface of the tear band. Perforations or other lines of weakness are formed in the sealing tape, along the edges of the tear band. In order to open the container, the tear band is gripped at one end and pulled upwardly. The body of the tape, being formed of a suitable paper, cloth, plastic or other material which has a tear strength considerably less than that of the underlying tear band, easily tears away to release the container flap. The tape, which is adhesively secured to the closing flaps of the container along its full length, to regions immediately adjacent to the side edges of the reinforcing strip, severs neatly along the boundary between the reinforcing strip and the adhesive bond to the container flaps, providing a neat, clean opening as the tear strip is removed.

In a modified form of the invention, a sealing tape structure includes spaced-apart reinforcing guide strips disposed closely adjacent to and on each side of the central strip, which forms the tear band. All three of the reinforcing strips are bonded by adhesive, heat sealing or other means to the tearable sealing tape. The respective guide strips are in most cases secured to the bottom surface of the sealing tape and are provided with adhesive coatings along their bottom surfaces. Accordingly, when the tearable sealing tape is applied to the closed container, the spaced-apart guide strips are adhesively bonded to the container flaps or walls, in some cases along with the lateral margins of the tape itself. The central reinforcing tear band element is free of adhesive along its bottom surface and bridges the gap between adjacent walls or flaps of the closed container.

In certain advantageous modifications of the invention, reinforcing guide strips of very narrow width are provided along each side edge of the central reinforcing tear band. These narrow guide strips are bonded to the bottom surface of the tearable tape, along with the central reinforcing strip, and adhesive coated margins of the tearable tape extend along side the narrow guide strips at each side. When the sealing strip structure is applied to a container, the narrow guide strips may, but need not necessarily be adhesively bonded to the respective flaps being closed and sealed by the tape. In either case, when the central reinforcing tear band is removed, a neat, clean tear, along the area between the central tear strip and the narrow guide strips.

In a still further modification of the invention, a length of tearable tape bridges over the gap between container flaps and seals them in a closed position. A single reinforcing band, constituting a tear ban,, is adhered centrally to the bottom surface of the tape and bridges over the gap area between the closure flaps. Immediately adjacent to the side edges of the tear band, and extending longitudinally along the tape, are lines of weakness, formed in the tape, as by mechanically weakening the tape and/or heat treating the plastic material thereof, to facilitate tearing along neat, straight lines, when the tear band is removed.

For a more complete understanding of the above and other features and advantages of the invention, reference should be made to the following detailed description of preferred embodiments of the invention and to the accompanying drawing.

DETAILED DESCRIPTION OF THE INVENTION

Figure 1:
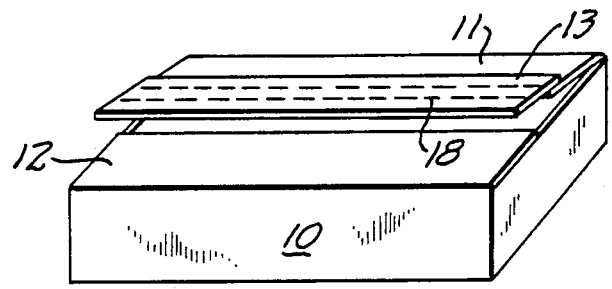
FIG. 1 is a perspective view of a package arranged to be closed by a sealing tape structure according to the invention, which includes a tear strip device disposed along the central portion thereof.
Figure 4:
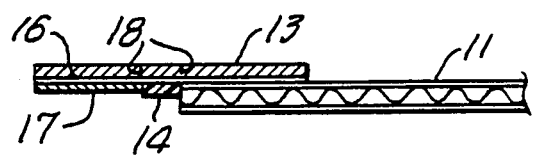
FIG. 4 is an enlarged, fragmentary cross-sectional view taken generally along line 4—4 of FIG. 1, showing the sealing tape applied to a package.

Referring now in detail to the drawings for the purpose of illustrating the present invention, FIG. 1 shows a container 10 provided with a tear band 14, or with a thread 15 having a plurality of woolen hairs, which is attached by an adhesive 16 to the bottom surface of a sealing tape 13. The band 14 or thread 15 on the bottom surface of the sealing tape 13 is positioned between adjacent portions of the adhesive 16 (FIG. 4). The band 14 is disposed within spaced perforated punch lines 18 (FIG. 1, 6), whereas the thread 15 is located below a single perforated punch line 18' (FIG. 7).

Figure 2:
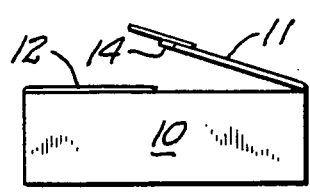
FIG. 2 is an end elevational view of the package of FIG. 1.
Figure 3:
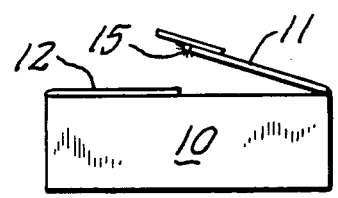
FIG. 3 is an end elevational view similar to FIG. 2 wherein the sealing tape includes a tear strip in the form of a non-tearable thread or string.

The exposed adhesive portions 16 are disposed substantially parallel to each other and to the band 14 or thread 15. In the form of the invention shown in FIGS. 2 and 4, one adhesive portion of the sealing tape 13 is tightly attached to one outside closing flap 11 of the container. The other adhesive portion is releasably covered by a cellophane tape 17. After the cellophane tape 17 is removed, and the sealing tape 13 is attached to the other outside closing flap 12, the container 10 is tightly sealed.

The container 10 can be made of paper, plastic, or the like. The band 14 or thread 15 can be made of any type of material which is sufficiently strong to cut paper or plastic products. Suitable materials for the band 14 or thread 15 include cotton, synthetic fiber, aluminum, stainless steel or the like.

Figure 5:
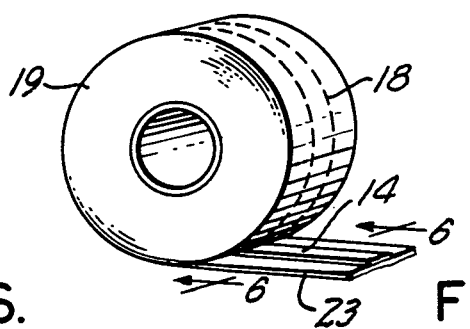
FIG. 5 is a perspective view of a roll of sealing tape forming another embodiment of the invention.
Figure 6:
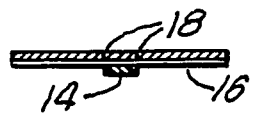
FIG. 6 is a cross-sectional view taken on line 6—6 of FIG. 5.
Figure 7:
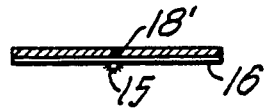
FIG. 7 is a cross-sectional view similar to FIG. 6, showing the use of a non-tearable thread as a tear band.

In another embodiment of the invention, shown in FIGS. 5, 6 and 7, the opening device of the present invention can be used in the form of a continuous length of sealing tape 23 which can be used to seal packages of various type's. Thus the sealing tape 23, which contains a dry or wet adhesive 16 on one side, is provided with a tear band 14 or thread 15. The band 14 or thread 15 is adhesively attached to the adhesive side of the tape. The band 14 is disposed within perforated punch lines 18 (FIGS. 5 and 6), or the thread 15 is under a perforated punch line 18' (FIG. 7). The sealing tape, which can be stored in a roll 19, can be merely unwound and used to seal packages by wetting the adhesive 16, if necessary, and attaching it to the package. When it is later desired to open the package, the band 14 or thread 15 is freed-up at the free end of the tape 13 and pulled away from the package to tear the sealing tape and thereby open the package. The tear band 14 or thread 15 can be made of plastic, aluminum, stainless steel, or the like. The sealing tape 13 is made of paper, plastic, cloth, or the like.

Figure 8:
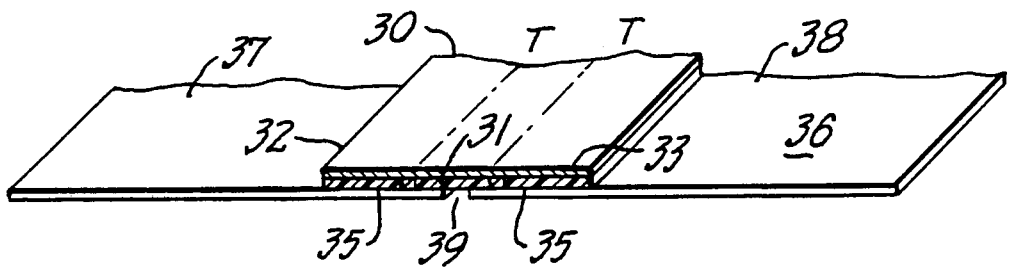
FIG. 8 is an enlarged, fragmentary cross-sectional view illustrating a further modified form of sealing tape structure according to the invention, wherein the bottom surface of the sealing tape carries a central reinforcing tear band and spaced-apart reinforcing guide strips along each side thereof, with the tear band bridging the gap between adjacent closure flaps.

In the modified form of the invention shown in FIG. 8, a sealing tape structure is provided which includes a thin, tape 30 of a tearable material, which may be paper, cloth, plastic or the like. In the center portion of the tape, there are adhesively bonded a central tear band 31 and spaced-apart guide strips 32, 33 arranged on either side, closely adjacent to the side edges of the tear band. The bottom surfaces of the guide strips are coated with adhesive at 35. The bottom surface of the tear band remains free of adhesive.

As indicated in FIG. 8, the sealing tape structure is applied to a container 36 which, in the illustration, is a plastic bag, for example. The sealing tape is adhesively bonded or heat bonded to a pair of closing flaps 37, 38, with the tear band 31 located in the region of the gap 39 between the two flaps and serving to close and seal the bag. In the illustration of FIG. 8, the tear band 31 bridges the gap 39. It will be understood, however, that the functioning of the invention is the same, even if the gap 39 is of greater width than the tear band 31, or even in cases where the flaps 37, 38 overlap. Typically, the sealing tape structure is coextensive with the length of the closing flaps 37, 38.

In order to open the container 36, the tear band 31 is gripped at one end and torn upwardly, to rupture the tearable tape 30. Because the tape 30 is bonded to the respective spaced-apart guide strips 32, 33, a neat, clean tear strip opening is provided along the inner edges of the respective guide strips, as the tear band 31 is progressively removed.

Figure 9:
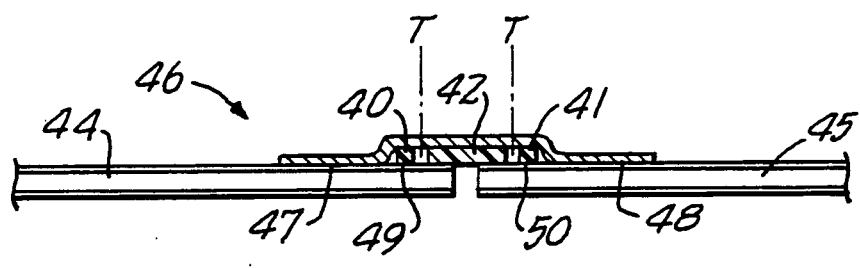
FIGS. 9 and 10 illustrate a further modified form of the invention, in which the sealing tape structure is provided with a relatively wide, central reinforcing strip constituting the tear band and with very narrow longitudinally extending guide strips adjacent each side edge of the tear band. The narrow guide strips are selectively bonded (or not) to the carton flaps or walls, as desired, functioning in either case as guide strips to confine the tearing of the sealing tape when the tear band is lifted.
Figure 10:
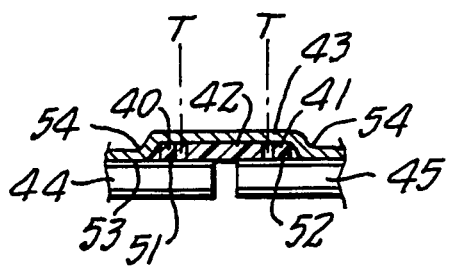

The modifications of FIGS. 9 and 10 are somewhat similar to the modification of FIG. 8, except that: the sealing tape structure includes a pair of spaced-apart guide strips 40, 41 which are significantly narrower than the tear band 42, which is straddled by the guide strips. In the modification of FIG. 8, for example, the tear band and guide strips may have a width of, say, $\frac{3}{8}-\frac{1}{2}$ inch. In the modifications of FIGS. 9 and 10, the tear band 42 may have a width of, for example, $\frac{3}{8}-\frac{1}{2}$ inch, while the respective guide strips 40, 41 are a fraction of that width, say about 1/16 of an inch, it being understood that the dimensions given are for illustrative purposes only.

The sealing tape structure of FIG. 9 and 10 includes a tearable sealing tape 43 which overlies the tear band 42 and the guide strips 40, 41 and is adhesively bonded to all of them. The sealing tape 43 is wider than the collection width of the strips 40-42 and is adhesively secured to closing flaps 44, 45 of a container 46 by means of adhesive areas 47, 48 which extend over the edge margins of the tape 43, from the outer edge extremities of the tape up to the respective guide strips 40, 41. In the modification of FIG. 9, the bottom surfaces of the guide strips 40, 41 are also coated with adhesive, at 49, 50, while the bottom surface of the tear band 42 remains free of adhesive. The functioning of the modification of FIG. 9 is similar to that of FIG. 8. In appropriate cases, the narrow guide strips 40, 41 may be formed of a strong thread or string. The tear line of the tearable strip 43 will in each case be along the axis of the lines "T".

The modification of FIG. 10 conforms substantially to that of FIG. 9 except that, in the case of the FIG. 10 modification, there is no adhesive over the bottom surface areas 51, 52 of the respective guide strips 40, 41. This version is somewhat more economical to manufacture in that adhesive 53 may be applied across the entire bottom surface of the tearable carrier tape 43, and the tear band 42 and guide strips 40, 41 are adhered to the tearable tape by way of such adhesive. The structure is applied to the closed flaps 44, 45 of the container in the same manner as in FIG. 9. When the container is opened, by tearing back the tear band 42 to rupture the tearable tape 43, the tear line will follow along the inside surfaces of the guide strips 40, 41, as indicated by the lines "T" in FIG. 10. Even though the guide strips 40, 41 are not adhesively bonded to the container flaps, the narrowness of the guide strips, in conjunction with the fact that the tearable tape is adhesively bonded up to points 54, closely adjacent the outside edges of the guide strips, enables the guide strips to function in a manner to effectively confine the tearing of the tape 43 and provide a neat, clean tear opening.

Figure 11:
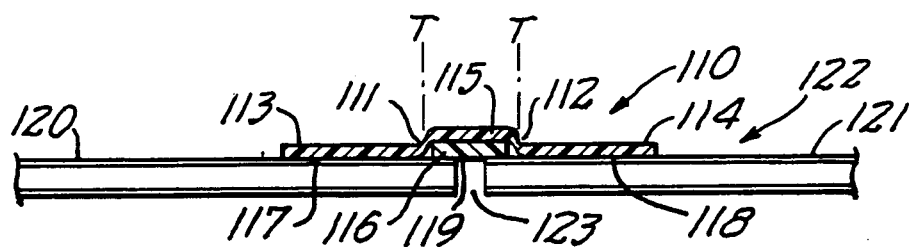
FIG. 11 illustrates a further modified form of the invention in which a plastic tearable sealing tape is grooved longitudinally to form longitudinally extending lines of weakness. A tear band is bonded to the bottom surface of the tearable tape, in the central region between the lines of weakness. When the tear band is removed, the opposite side margins of the tearable tape function as guide strips, with the tape tearing cleanly along the respective lines of weakness.

The modification of FIG. 11 illustrates a tape structure which includes a section of tearable tape 110 which has been provided with continuous, spaced-apart, longitudinally extending grooves 111, 112 in its center portion. A tear band 116 is bonded to the tearable center portion 115, along the full length of the tape structure 110. The outer marginal portions 113, 114 of the tape structure are coated with adhesive at 117, 118, extending from the outer edge extremities up to a point adjacent to but not including the bottom surface 119 of the tear band 116. In the illustration of FIG. 11, the tear tape structure is applied to closure flaps 120, 121 of a container 122, with the tear band 116 bridging over the gap 123 between the closed flaps. When the tear band 116 is gripped at one end and pulled outwardly, the central section 115 of the tearable tape is severed along the well defined grooves 111, 112 to provide a neat, clean opening. The grooves 111, 112 may be formed by rolling and/or heating, for example.

It will be understood, of course, that in all of the various modifications illustrated in cross section, the various elements are of generally continuous construction, with the tear tape structures being formed in continuous length and typically prepared in large rolls for application at the time of manufacture or at the time of closing of the containers, as the case may be. Likewise, the elements shown in cross section are of generally constant cross section throughout their length.

The elements utilized in the capacity of tear band are, of course, of a material suitably strong for the purpose. This may include varieties of plastic and other synthetic materials, fiberglass reinforced tape, reinforced paper, metal foils, and the like. Specific materials suitable for the purpose are easily identified by those skilled in the art, depending upon the particular circumstances, such as the construction and tear resistance of the container wall, if opening a continuous wall, or strength of the sealing tape, where closing a pair of container closure flaps, for example.

Elements used in forming the guide strips may in general be of the same character as for the tear band materials, although the guide strips typically need not be as strong as the tear band.

It will be further understood that the specific forms of the invention herein illustrated and described are intended to be representative only, as certain changes may be made therein without departing from the clear teachings of the disclosure. Accordingly, reference should be made to the following appending claims in determining the full scope of the invention.

I claim:

1. A sealed container with tear-opening feature, which comprises,
   (a) a container provided with a pair of opposed closure flaps,
   (b) said closure flaps, when closed, defining an elongated closure line extending for the length of the container,
   (c) a tear-open tape structure extending continuously along said closure line, bridging over said line and adhesively secured to outer surfaces of respective closure flaps on opposite sides of said closure line to join said flaps across said closure line,
   (d) said tear-open tape structure being formed of a thin, strip of tearable carrier tape having upper and lower surfaces and opposite side edges,
   (e) a tear band bonded to the lower surface of said tearable carrier tape and extending longitudinally of said tape, along its full length,
   (f) said tear band being of substantially less width than said tearable carrier tape and being located inwardly of the respective side edges of said tearable tape,
   (g) said tear band having an exposed bottom surface free of adhesive material and being positioned on outer surface of said container to bridge over said closure line along its length,
   (h) guide means on each side of and immediately adjacent to opposite side edges of said tear band and extending in longitudinally coextensive relation with said tear band,
   (i) said tear-open tape structure being coated with an adhesive material over portions of its bottom surface on opposite sides of said tear band but excluding the bottom surface of said tear band,
   (j) means including said adhesive material for retaining said guide means in position on said container flaps during removal of said tear band, whereby the tearing of said tearable carrier tape by said tear band is confined to clean, straight lines defined by inner edges of said guide means,
   (k) said flaps being freed to open by removal of said tear band.

2. A sealed container with tear-opening feature, which comprises,
   (a) a container provided with a pair of opposed closure flaps,
   (b) said closure flaps, when closed, defining an elongated closure line extending for the length of the container,
   (c) a tear-open tape structure extending continuously along said closure line, bridging over said line and adhesively secured to the respective closure flaps on opposite sides of said closure line,
   (d) said tear-open tape structure being formed of a thin, strip of tearable carrier tape having upper and lower surfaces and opposite side edges,
   (e) a tear band bonded to the lower surface of said tearable carrier tape and extending longitudinally of said tape, along its full length,
   (f) said tear band being of substantially less width than said tearable carrier tape and being located inwardly of the respective side edges of said tearable tape,
   (g) said tear band having an exposed bottom surface free of adhesive material and being positioned on said container to bridge over said closure line along its length,
   (h) to opposite side edges of said tear band and extending in longitudinally coextensive relation with said tear band,
   (i) said tear-open tape structure being coated with an adhesive material over portions of its bottom surface on opposite sides of said tear band but excluding the bottom surface of said tear band, (j) means including said adhesive material for retaining said guide means in position on said container flaps during removal of said tear band, whereby the tearing of said tearable carrier tape by said tear band is confined to clean, straight lines defined by inner edges of said guide means, (k) said guide means comprising a pair of reinforcing guide strips bonded to said tearable sealing tape on each side of and immediately adjacent to said tear band.

3. A sealed container according to claim 2, further characterized by (a) said reinforcing guide strips being bonded to the bottom surface of said tearable tape.

4. A sealed container according to claim 3, further characterized by (a) said adhesive material being applied over the bottom surfaces of said reinforcing guide strips, whereby said guide strips are bonded to the respective closure flaps of said container and are retained thereon during removal of said tear band.

5. A sealed container according to claim 4, further characterized by (a) said guide strips being of very narrow width in relation to the width of said tear band.

6. A sealed container according to claim 3, further characterized by (a) said guide strips being of very narrow width in relation to the width of said tear band, (b) said tape structure being coated on its bottom surface area with adhesive, excluding the bottom surfaces of said tear band and of said reinforcing guide strips.

7. A sealed container according to claim 1, further characterized by (a) said guide means comprising lines of weakness formed in said tearable tape together with adjacent portions of said carrier tape immediately outside of said lines of weakness.

8. A roll of sealing tape with tear-open feature, which comprises (a) a continuous length of tearable carrier tape material provided with adhesive means on one surface thereof for bonding to closure flaps of a container, (b) guide means on said tape material and extending lengthwise thereof providing spaced-apart guides for lengthwise tearing of said carrier tape material in a central portion thereof, and (c) a tear band having a first surface adhered to said one surface of said carrier tape, and extending lengthwise thereof between said guide means, (d) said tear band having a second surface, opposite to said first surface, which is free of adhesive.

9. A roll of tape according to claim 8, further characterized by (a) said guide means are spaced lines of perforations formed in said tape material.

10. A roll of tape according to claim 8, further characterized by (a) said guide means being spaced guide strips adhered to and carrier by said one surface of tape.

* * * * *